United States Patent [19]

Beshai et al.

[11] Patent Number: 5,136,578
[45] Date of Patent: Aug. 4, 1992

[54] TRANSPOSED MULTI-CHANNEL SWITCHING

[75] Inventors: Maged E. Beshai, Nepean; L. Anne Garrett, Ottawa, both of Canada; Ian R. Stewart, Cary, N.C.

[73] Assignee: Northern Telecom Limited, Quebec, Canada

[21] Appl. No.: 586,088

[22] Filed: Sep. 21, 1990

[51] Int. Cl.⁵ ............................................. H04Q 11/04
[52] U.S. Cl. .................................. 370/58.1; 370/95.1
[58] Field of Search ....................... 370/109, 95.1, 94.1, 370/63, 84, 60, 58.1, 82, 105.1

[56] References Cited

U.S. PATENT DOCUMENTS

| | | | |
|---|---|---|---|
| 4,554,658 | 11/1985 | Morten et al. | 370/94.1 |
| 4,686,670 | 8/1987 | Kessels et al. | 370/68 |
| 4,713,804 | 12/1987 | Servel et al. | 370/68 |
| 4,787,081 | 11/1988 | Waters et al. | 370/84 |
| 4,912,700 | 3/1990 | Maddern et al. | 370/58.2 |

OTHER PUBLICATIONS

Roberts, J. W. and Hoang Van A., "Characteristics of Services Requiring Multi-Slot Connections and their Impact on ISDN Design", Proceedings of the fifth ITC Seminar, Lake Como, Italy, May 1987, pp. 97–115.
Roberts J. W., "A Service System with Heterogeneous User Requirements", Performance of Data Communications Systems and Their Applications, G. Pujolle (Ed.) North Holland (1981).
Kaufman, J. S., "Blocking in a Shared Resource Environment", IEEE Trans, on Com. vol. 29, No. 10, pp. 1474–1481 (1981).
Delbrouck, L. E. N., "On the Steady-State Distribution in a Service Facility Carrying Mixtures of Traffic with Different Peakedness Factors and Capacity Requirements", IEEE Trans. on Com. vol. 31, No. 11, pp. 1209–1221 (1983).
Beshai, M. E., "The Poissonian Spectrum Method for Treating a Loss System Serving Non-Poissonian Multi--Bit-Rate Traffic", IEEE InfocCom'89, Ottawa, Canada. pp. 1010–1018.
Beshai, M. E. and Manfield, D. R. "Multichannel Services: Performance of Switching Networks", Proc. ITC 12, Torino, Italy (1988) pp. 857–864.

*Primary Examiner*—Benedict V. Safourek
*Assistant Examiner*—T. Samuel
*Attorney, Agent, or Firm*—Nixon & Vanderhye

[57] ABSTRACT

A synchronous time division multiplexing system for multi-channel calls involves dividing each frame into a first segment and a second segment each containing substantially the same number of time slots and dividing the number of channels of the multi-channel call into a first subset and a second subset each containing approximately the same number of channels. Thereafter, the first subset is assigned to the first segment of the first frame and the second subset to the second segment of the first frame. The invention involves in a first time switching stage transposing the first subset to the second segment of the first frame such that the channels within the first subset occupy eligible free slots and retain their relative order and transposing the second subset to the first segment of the next frame such that the channels within the second subset occupy eligible free slots and retain their relative order. The call subsets are thus transported during a single stage of time switching. By assigning the selected slots in each segment in an ascending order, the output samples of a call will appear in the proper order but will not be properly positioned in the frame. When the transposed subsets are likewise switched in a second time-switching stage, the call samples will be positioned properly in the frame. Thus, traversing an even number of time switches, from source to termination, guarantees both frames consistency and the desirable slot order.

20 Claims, 9 Drawing Sheets

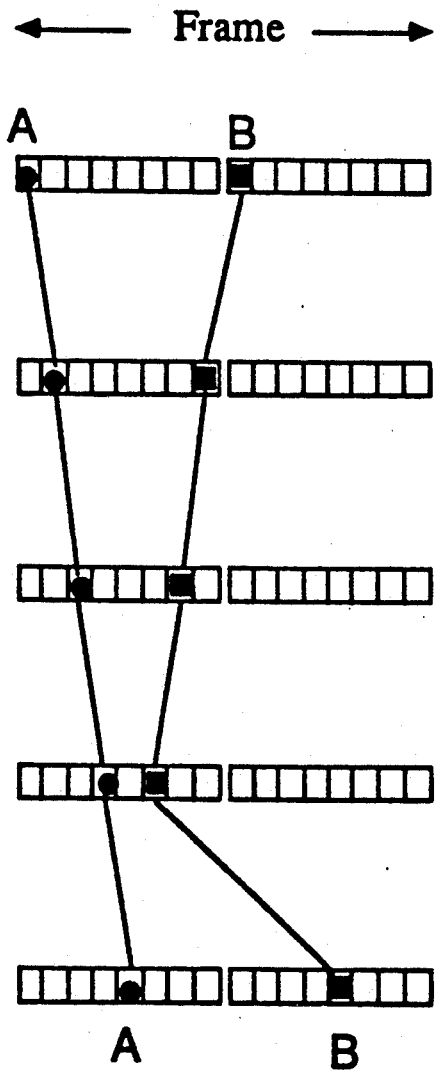 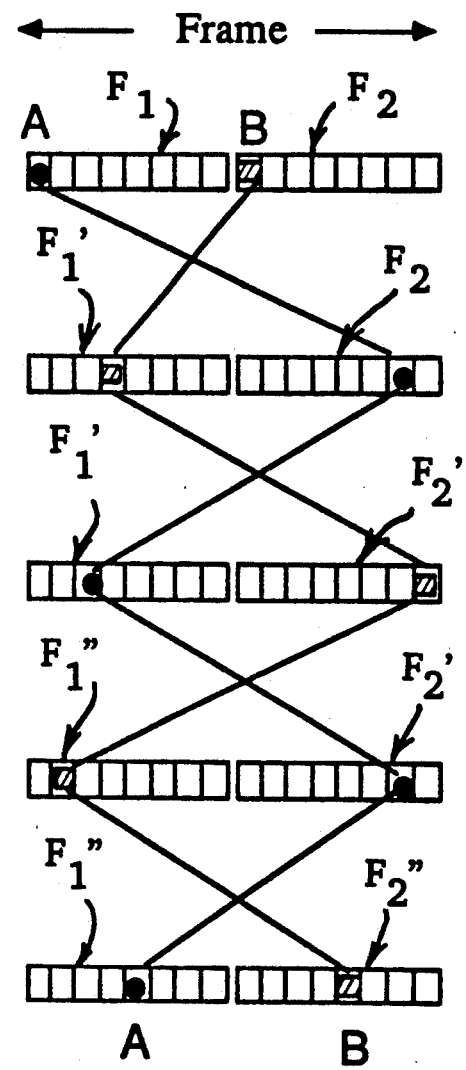
A : Switched in Same Frame
B : Delayed Three Frames
A & B : Delayed Two Frames Each
FIG. 2a
FIG. 2b

TRANSPOSED MULTI-CHANNEL SWITCHING

BACKGROUND OF THE INVENTION

This invention relates generally to synchronous time division multiplexing (TDM) of signals and data and, more particularly, to a TDM system in which a particular signal can be sampled more than once in a single frame or when synchronous data is to be transmitted at multiples of some basic rate.

In the conventional TDM communication system a plurality of different signals is sampled periodically in sequence typically in a voice communication system at a sampling rate of 8000 periods/sec. The sampling period or frame is, therefore, 125 $\mu$sec long and is subdivided into a plurality of equal duration time slots or channels. Each slot is dedicated to a specific one of the sampled signals except typically for certain slots which may be used for signalling and synchronization purposes. Each sample typically is a pulse code modulated (PCM) value represented by 8 bits. Such transmission systems exist in which the number of slots per frame is 1024 and higher.

To date, in all of the conventional TDM systems, a particular signal is sampled only once in each frame. It has been recognized that a need exists for transmitting signals or data of higher bit rates in the same network serving basic rate data. However, multi-slot (multi-channel) switching gives rise to difficulties such as the preservation of time slot order and frame consistency.

More particularly, at source encoding, a wide-band signal will naturally be sampled at equispaced instants in the frame period (125 $\mu$sec in telephony systems) and at termination the samples must be delivered to the receiver in the same order and they must belong to the same frame. The network comprises a number of switching nodes interconnected by trunk groups. A switching node, in turn, may comprise a single-stage time switch or arrays of time switches interconnected either by links or space switches. At each time switch, a sample is written during a time slot 'x' and read out during a designated time slot 'y'. $1 \leq x \leq N$, $1 \leq y \leq N$, N being the number of slots per frame. The data of input-slot x and output-slot y would belong to the same frame if $y \geq x$. Otherwise, the data of slot y would be one frame old. If all the samples of a call are switched likewise, i.e., all in the same frame or all in the subsequent frame, then the connection is frame-consistent and, naturally, the samples can be switched in the proper order. Attempting to satisfy this condition with independent switching of the individual channels is subject to randomness and is likely to succeed only at very low occupancy and, even then, subject to certain restrictions. It should be remembered that in the switching process the selection of eligible free slots is usually subject to matching constraints which differ in nature according to the internal design of the switch. These eligibility conditions of free time slots are not altered by this invention. Call rearrangement (reswitching) of existing connections to accommodate a new arrival may be used to increase the traffic capacity (i.e., permissible mean occupancy at a specified grade of service) of the switching node. However, this is both impractical and hazardous.

Several solutions have been reported in the literature (an extensive survey is given in [1]). Generally, they fall under two categories: post-switching and en route delay equalization. Post-switching equalization does not result in traffic-capacity loss but it increases the switching delay since a deep buffer would be needed at the receiving end. It requires new hardware and complex software control. En route equalization, in turn, may be realized in two ways, by frame retention or clever call packing.

With particular regard to the frame retention technique, if the time switch is designed to store two consecutive frames, retaining an extra frame which would not be needed for single channel calls, then during an output time slot y belonging to frame f, the data of input time slot x belonging to frames (f, f−1), if $y \geq x$, or frames (f−1, f−2), if $y < x$, would be available in the data memory. Thus, the data of time slot x of frame (f−1) is always present during frame f, regardless of the relative positions of x and y in the frame, and frame consistency is assured with an added round-trip delay of one frame per time switch.

The frame-retention technique does not reduce the traffic capacity. However, it doubles the switching delay and its implementation requires new switching nodes in which the time switches have deeper data memories (and wider addressing memories); it is therefore not suitable for multi-stage switching nodes.

The "call packing" techniques have been well studied for possible application in telephony switching to reduce matching loss in certain types of switching nodes. While, under the restriction of frame consistency, call-packing would offer significant advantages over first-encounter assignment of multi-channel calls, it is still wasteful of trunk-group capacity.

Packing is somewhat easier when the number of slots per frame is a power of two. A simple packing arrangement of a frame of N slots would be done with the help of a state vector of size N bits. Bit number i in the state vector stores the (busy/free) state of slot j, where j is the binary image of i; for example, in a 1024-slot frame (with the slots, numbered 0 to 1023), the index i:0011000001 (decimal 193) points to the state of frame slot j:1000001100 (decimal 524). The slot numbers need not be stored in the state vector. While such a scheme may be reasonably effective, it is still somewhat rigid, it results in traffic-capacity loss, and it increases the path assignment effort in the switch.

SUMMARY OF THE INVENTION

The invention deals with the frame consistency and slot order problem as follows. Let us first consider a single time switch in isolation and let the number of slots per frame be N, which is typically much larger than the maximum number of slots per call. N is an even number but need not be a power of two. The N slots are divided into two segments of N/2 slots each. The set of m slots of a wide-band call is divided into two subsets; one comprises the first $s_1 = \lceil m/2 \rceil$ slots and the other comprises the remaining $s_2 = m - s_1$ slots of the call ($\lceil \cdot \rceil$ denotes rounding up), the exception being the single-channel calls which may be used to balance the loads of the two segments of the frame. If the scheme is followed starting from source, then the $s_1$ slots will naturally be in the first half of the frame and the $s_2$ slots will be in the second half. The $s_1$ slots of a given call may be switched to any $s_1$ eligible free slots in the second segment of the frame while the $s_2$ slots would be switched to any $s_2$ eligible free slots in the first segment of the next frame. The call subsets are thus transposed during a single stage of time switching. By assigning the selected slots in each segment in an ascending order, the output samples of a call will appear in the proper order but will not be properly positioned in the frame. When the transposed subsets are likewise switched in a second time-switching stage, the call samples will be positioned properly in the frame. Thus, traversing an even number of time switches, from source to termination, guarantees both frame consistency and the desirable slot order.

Within a switching node, or across the internodal network, the number of time switching stages may not be even. If each switching node has an even number of time stages, then the technique will always work. If the number of stages is odd, then one of the stages should be designed for frame retention which has been discussed earlier. Thus, a single-stage node must employ the frame retention technique. This, however would be used optionally. For example, an intra-node (source-to-source connection) must use the frame retention capability while a source-to-trunk call would use transposed switching in the node (thus reducing the switching delay).

BRIEF DESCRIPTION OF THE DRAWINGS

FIG. 2a is a diagram illustrating the same problem but drawn in a cyclic time domain;

FIG. 2b is a diagram of the same type as FIG. 2a but illustrating the inventive technique;

FIGS. 3b and 3c illustrate intra-node and inter-node switching, respectively, in the network of FIG. 3a;

FIG. 4d is a graph of blocking versus total occupancy for the network of FIG. 4a;

FIG. 5b illustrates transposed switching of a five-slot call in the network of FIG. 5a;

DETAILED DESCRIPTION OF PREFERRED EMBODIMENTS

Figure 1:
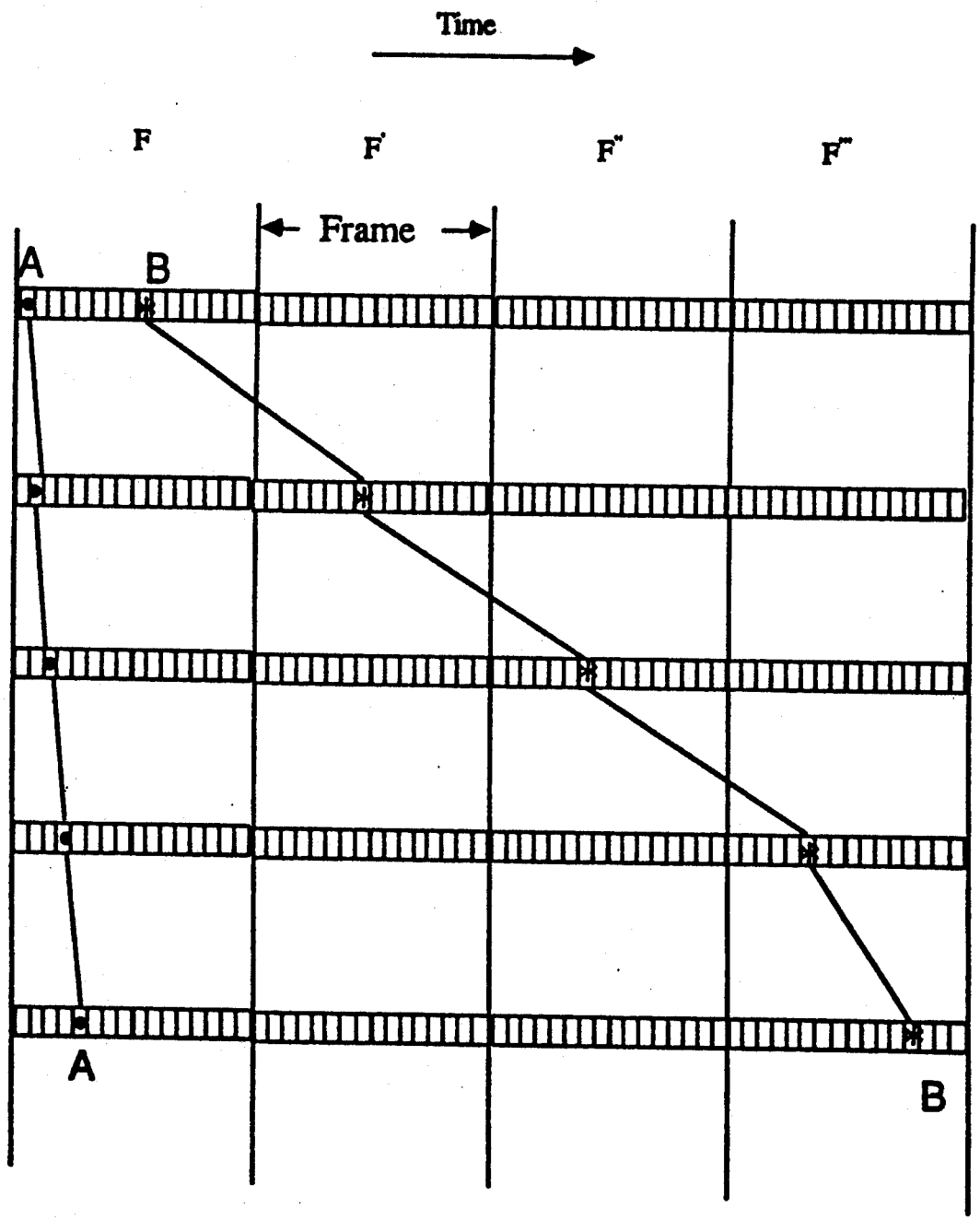
FIG. 1 is a diagram illustrating the problem of slot order and frame consistency.

With reference to FIG. 1, the uppermost row represents the input of the first time switching stage of a multi-stage switching sequence. A first sample A is contained in a first slot of a sixteen slot frame, slot 0 in this example, and a second sample B of the same signal is contained in a second slot, slot 8 in this example, the slots of the frame being numbered 0–15.

The second from top row represents the output of the first switching stage. Sample A is read out in the first free slot of the frame F which, for the purposes of this explanation, is slot 1. Sample B is read out in the first free slot appearing after slot 8. It happens that none of the slots 9 to 15 is free but slot 7 of the subsequent frame F' is and that is where sample B is read out. Similarly, during the next time switching operation (between rows 2 and 3) a free slot is found for read out of sample A in the same frame, specifically at slot 2 whereas no free slot for sample B is present between slots 8 and 15. Sample B has to be read out in the first available slot of the next frame F'' which happens to be slot 6 again. After four time switching stages sample B is in frame F''' which is three frames behind sample A. This pattern is repeated for successive samples of the signal for the entire duration of the call.

It should be appreciated that if unpredictable delays between samples of the same signal occur in this way for every frame the final output would be meaningless as it could not be decoded properly, unless we keep track of the delays encountered in each switching stage and compensate at the receiving end accordingly.

FIG. 2a represents exactly the same situation as FIG. 1 except that the information is shown in the cyclic domain for ease of comparison with FIG. 2b.

Turning now to FIG. 2b, which illustrates the technique of the invention, the frame is logically divided into two equal segments of 8 slots each. The first segment or frame half is denoted $F_1$ and the second frame half $F_2$.

In the example shown, sample A of the signal as before occupies slot 0 and sample B occupies slot 8 as shown in the top frame. Thus, sample A is in frame half $F_1$ and sample B is in frame half $F_2$. In the first switching operation sample A is read into the first available (free) slot of second frame half $F_2$ and sample B is read into the first available slot in the first frame half $F_1'$ of the next frame F'. Thus, in the position shown at the second top row sample B is a frame behind sample A. In the next switching operation, between rows 2 and 3, sample B which is in the first frame half $F_1'$ is transposed to the first free slot of the second frame half $F_2'$ and sample A is transposed from second frame half $F_2$ to the first frame half $F_1'$ of the next frame F'.

Going now from row 3 to 4 sample A is transposed from frame half $F_1'$ to the second half $F_2'$ of the same frame F' and sample B is transposed from frame half $F_2'$ to the first half $F_1''$ of the next frame F''. Finally, going from row 4 to row 5, sample A is transposed from frame half $F_2'$ to the first half $F_1''$ of Frame F'' and sample B is transposed from the first half $F_1''$ to the second half $F_2''$ of the same frame.

In the entire switching process samples A and B have been delayed two frames each and end up in the same frame in the correct order. Note that the statistical mean delay in traversing four time switching stages is two frames. Therefore, the transposition does not indeed increase the delay. This example can similarly be extended to any number of slots per signal, provided this number is less than the number of slots per frame.

Figure 3A:
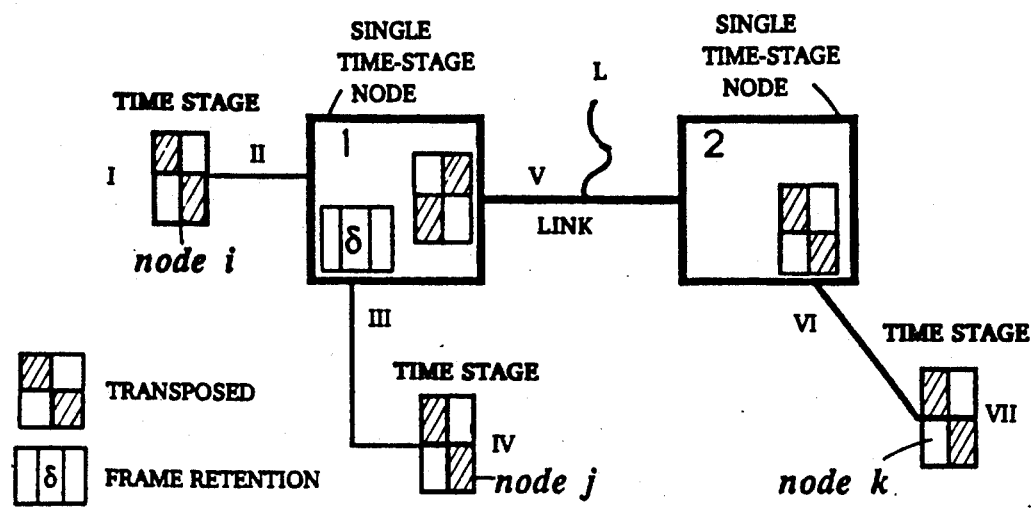
FIG. 3a illustrates schematically a network of single-stage nodes with which the invention may be practised.

The technique described above can be used in a network comprising a number of concentrating nodes interconnected through distributing nodes. The channel capacity of a distributing node is normally much larger than that of a concentrating node. We analyze the cases of ideal internally non-blocking nodes and matching nodes of the T-S-T structure. A concentrating node may be constructed as a single time switch. The capacity of a time switch is determined primarily by the speed limits of its data and addressing memories. At a given switching rate, N slots per frame, say, a channel capacity of JN, J>1, is realized by parallel connection of time switches. A non-blocking distributing node may be constructed by connecting time switches in a square matrix. A J×J matrix of N-slot time switches is equivalent to a single JN-slot time switch, i.e., it is inherently non-blocking. The distributing nodes in FIG. 3a are assumed to be of this type and blocking occurs at the inlet/outlet concentrating stages. The distribution node of FIG. 3a is the subject of U.S. Pat. No. 4,470,139 which issued on Sep. 4, 1984. The disclosure of that patent is incorporated herein by reference. Alternatively, two arrays of J time switches may be connected by a J×J space switch, forming the familiar T-S-T node with a channel capacity of JN (FIG. 4).

With particular regard to FIG. 3a, which illustrates a network of single stage nodes, nodes i, j and k are concentrating time switching nodes (often called peripheral modules) each of which may be connected to a source encoder (not shown) or to a link from another switch. Nodes i and j are connected to a distributing node 1 and node k is connected to a distributing node 2. Nodes 1 and 2 are interconnected by a link L. Switching at the various nodes is controlled by processors (not shown) which may be programmed to carry out the transposition switching as described above generally with reference to FIG. 2a and as will be described below specifically with reference to FIG. 3.

Figure 3B:
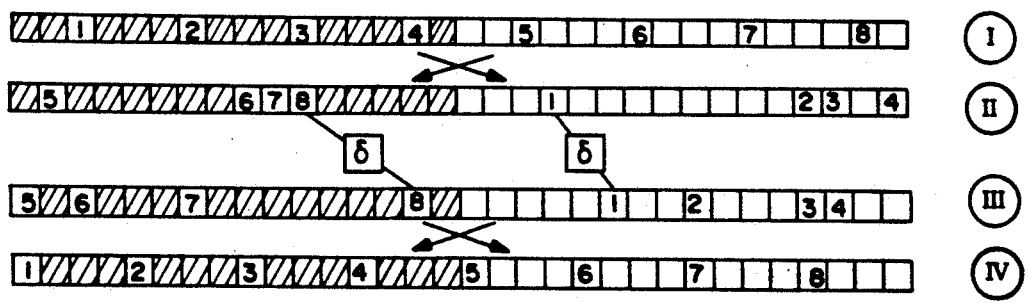
Figure 3C:
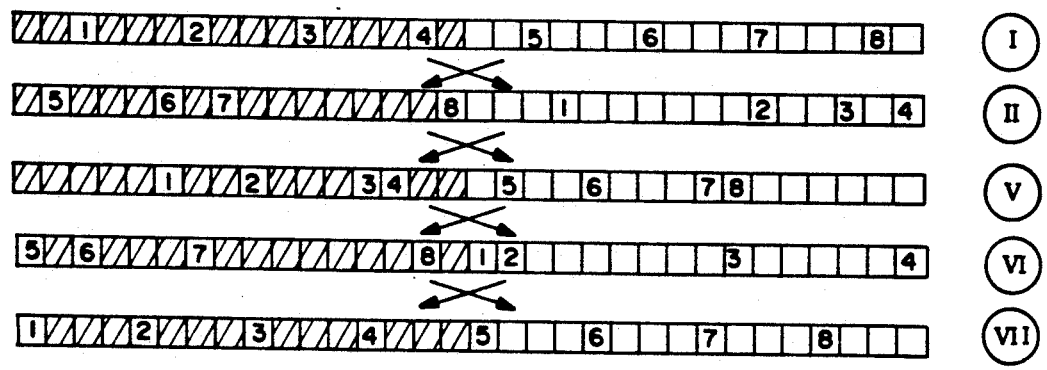
Figure 6:
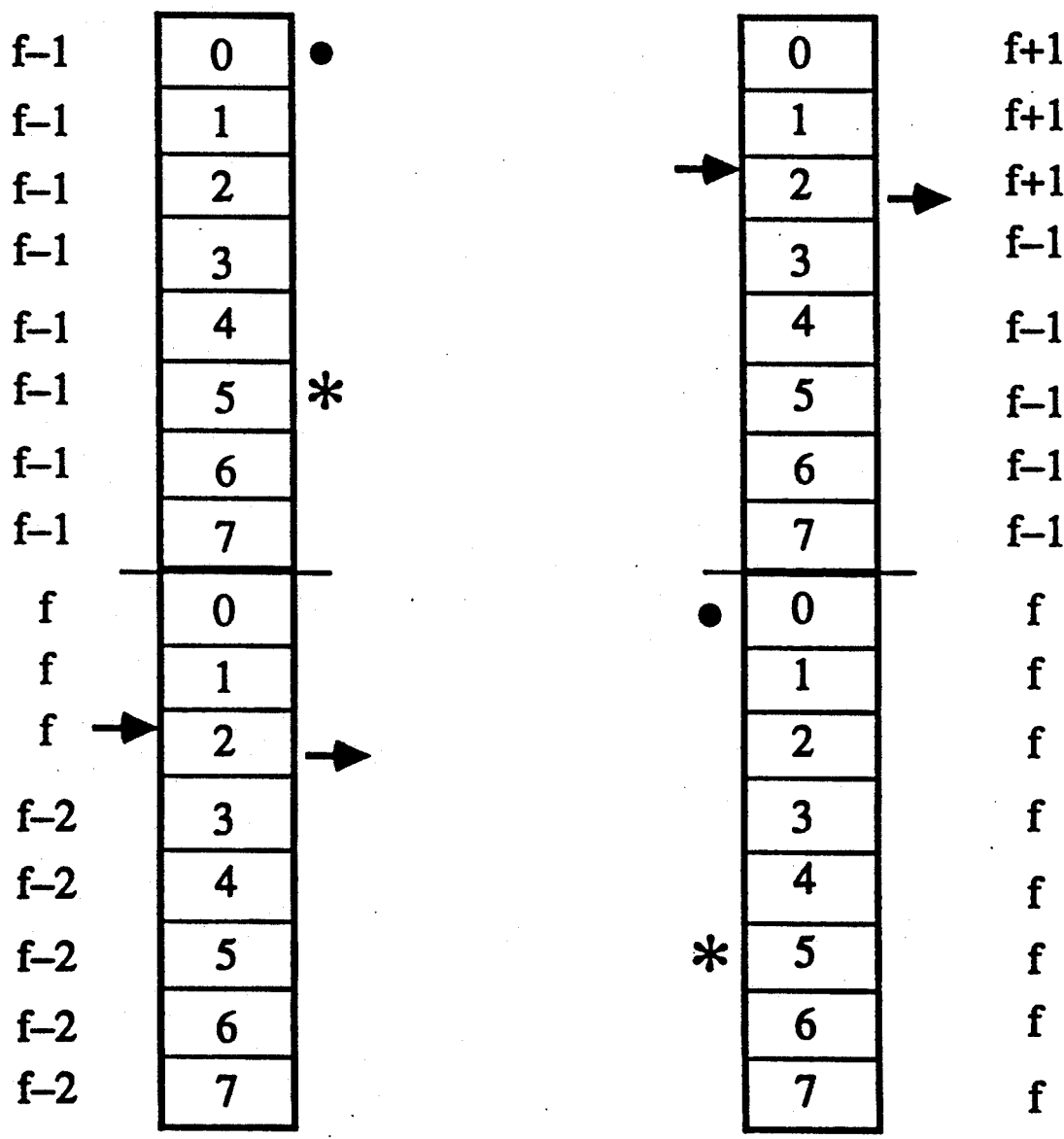
FIG. 6 illustrates frame retention using a double-size single buffer in the time switch.

Within a distributing node, or across the internodal network, the number of time switches may not be even. If each distributing node has an even number of time stages, then the transposed assignment yields frame-consistent connections. If the number of time stages in a distributing node is odd, then one of the stages should be designed for frame retention. In the stage with frame retention the samples of a signal can always be switched in the proper order at the expense of one-frame delay. Thus, a single-stage distributing node must employ the frame retention technique. This, however, would be used optionally. For example, an intra-node (source-to-source connection) must use the frame retention capability while a source-to-trunk call would use transposed switching in the node (thus reducing the switching delay). This is illustrated in FIG. 3b where an 8 slot call between sources served by the same distributing node uses frame retention (path I, II, III, IV) and in FIG. 3c where a call traversing two distributing nodes relies only on transposition (path I, II, V, VI, VII). Frame retention, denoted by symbol δ, may be implemented in different ways, for example by using a single deep buffer (double the frame size) as illustrated in FIG. 6. Such arrangements are well known in the art and will not be discussed any further.

Figure 4A:
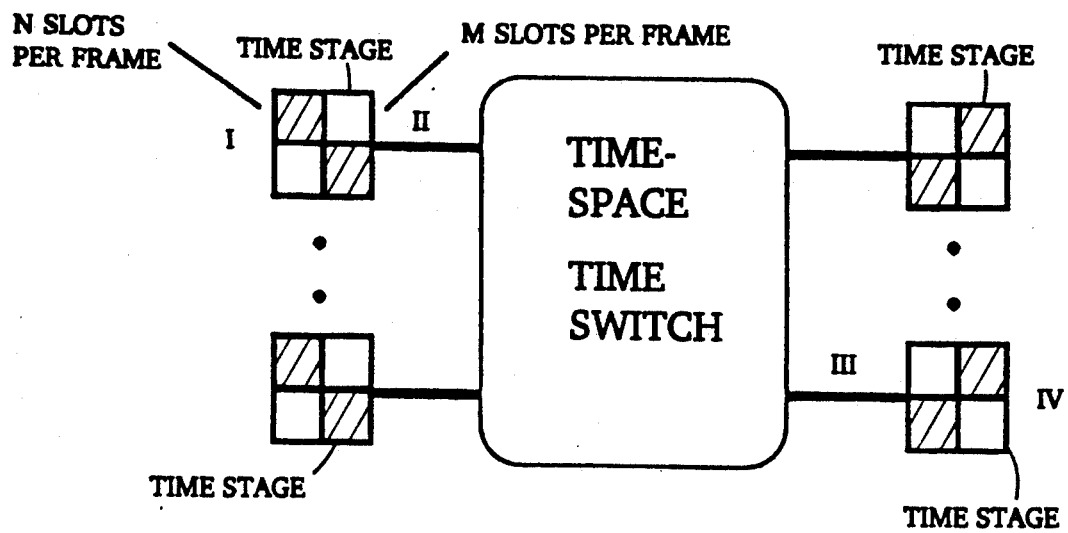
FIG. 4a illustrates schematically a typical time-space-time (T-S-T) switching network.
Figure 4B:
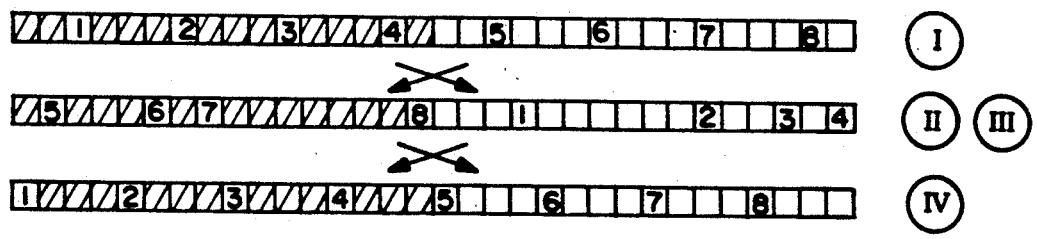
FIG. 4b illustrates the transposed switching technique as applied to the T-S-T network.
Figure 4C:
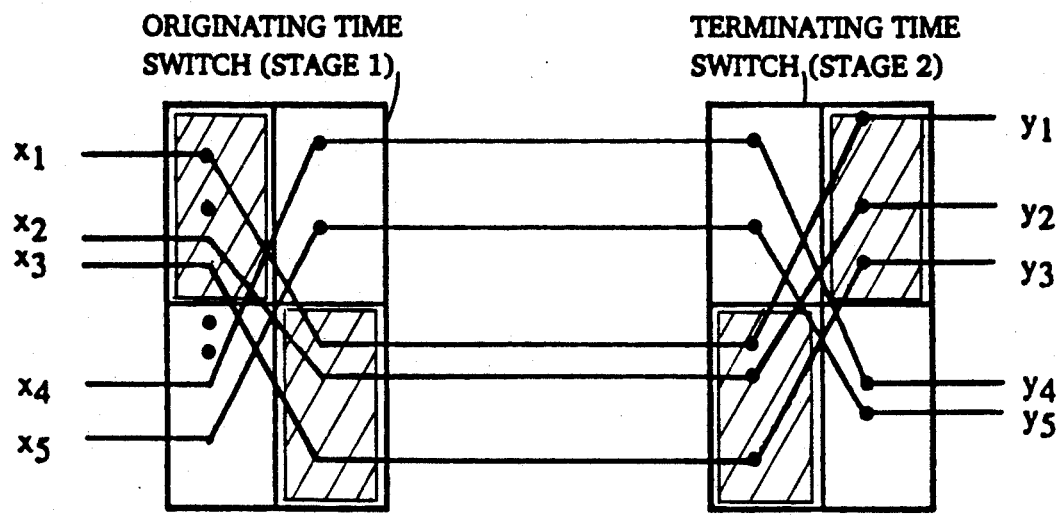
FIG. 4c illustrates transposed switching involving an odd number of slots per call.
Figure 4D:
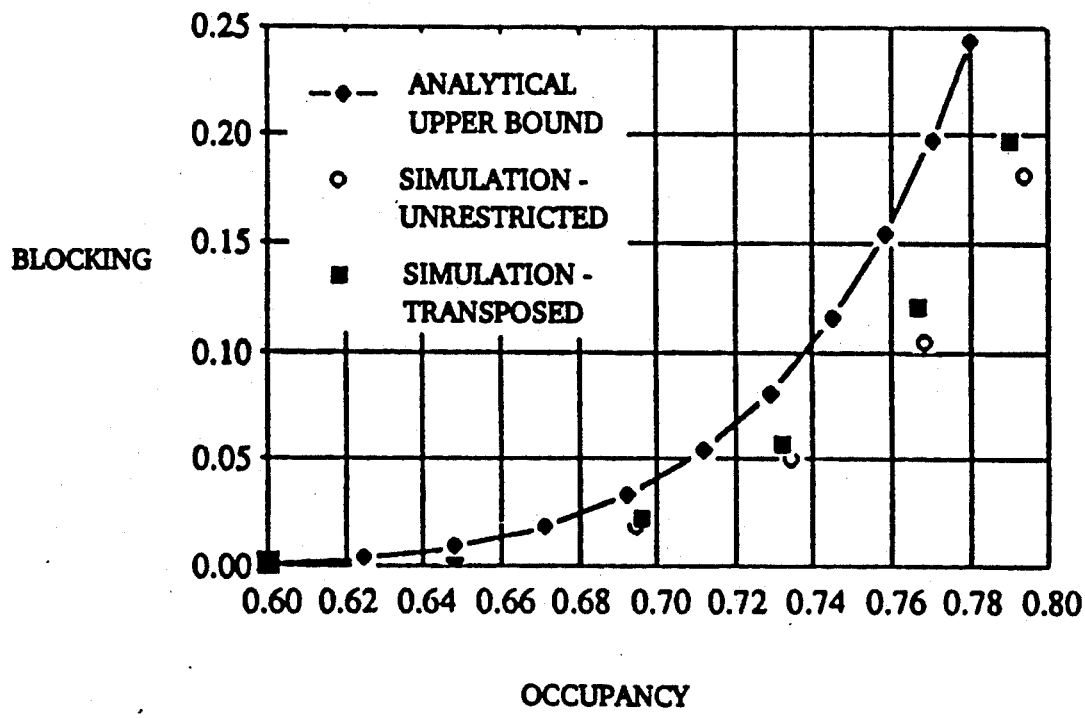
Figure 5A:
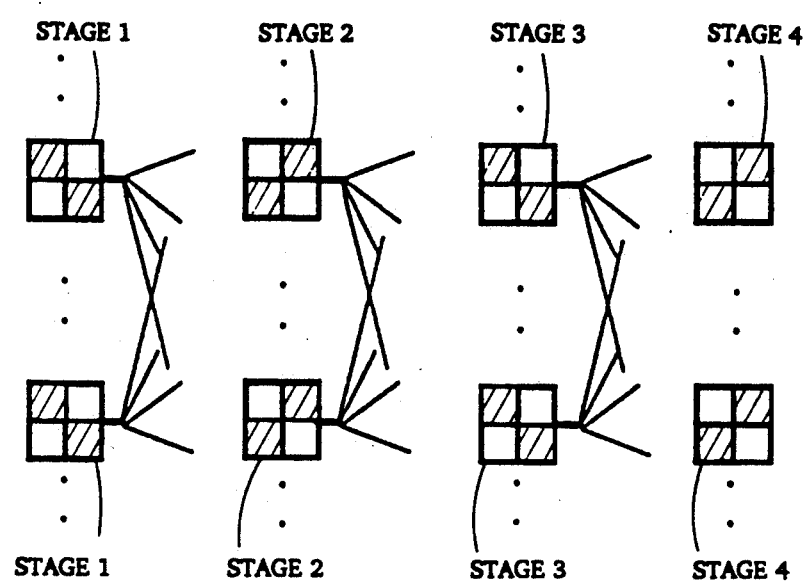
FIG. 5a illustrates schematically a 4-stage node.

FIGS. 4 and 5 illustrate the cases of a T-S-T network and a 4-stage network, respectively, where frame retention is not needed since the number of time stages per node is even. In the T-S-T structure, an m-slot call is rejected if the number of free slots in either of the outer buses of the originating and terminating time switches is less than m. Otherwise, a "temporal" matching process of the free slots of the two inner buses is performed and the call is accepted if $s_1$ matching slots are found in the second half of the frame and $s_2$ matching slots are found in the first half. Successful matching is likely when the number of free slots in each of the two buses is significantly larger than m which is a typical case. In the structure of FIG. 5, the outer (originating/terminating) stages concentrate the traffic and a "spatial matching" process in the inner stages is performed when the number of free slots in each of the originating and terminating buses in question equals or exceeds m. The matching is done separately in the upper and lower halves of the frames of each link and the transposed-assignment scheme is easy to implement. The spatial matching loss in a well-designed node is usually negligible compared to the outer blocking.

Figure 5B:
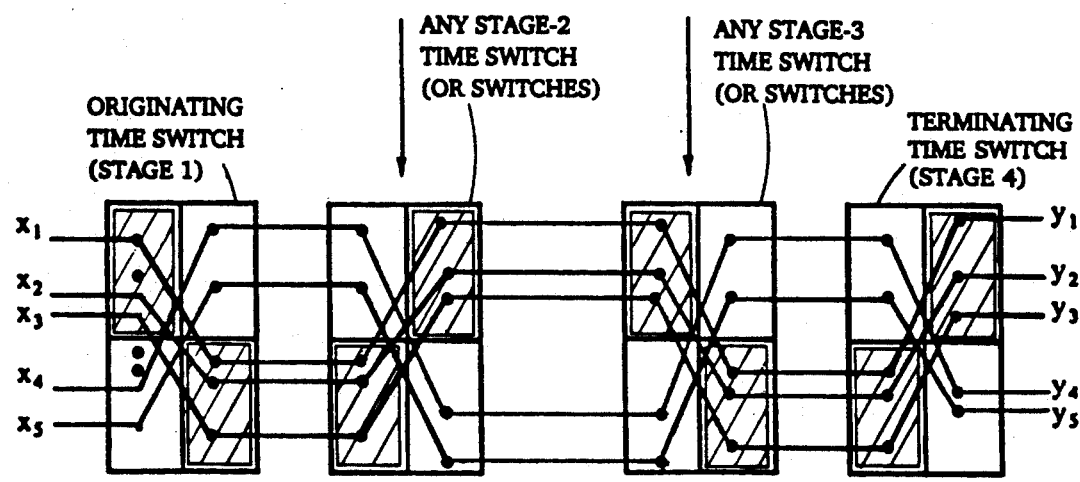

FIGS. 4c and 5b illustrate transposed switching when there is an odd number of slots per call, specifically five in the examples shown. The slots are divided into three in the first frame half and two in the second frame half. Alternatively, the division could be two in the first half and three in the second half. Either way of dividing will work as long as it is applied consistently.

By definition, the channel capacity is the available number of channels in the system or component under consideration while the traffic capacity is the mean occupancy at a specified grade-of-service (blocking in this case). We determine the traffic capacity of nodes using transposed switching and compare with the corresponding maximum traffic capacity. We shall first determine the traffic capacity of an isolated concentrating time-switching node with unrestricted (independent) assignment and transposed assignment (the unrestricted assignment can be used with frame retention or post-switching equalization). The packing method is studied by means of simulation.

Maximum traffic capacity is realized with unrestricted assignment. Consider a mixture of traffic streams. The call intensity of an offered traffic stream is defined as the number of simultaneous calls in service, while the load intensity is the number of occupied channels, if the traffic is offered to an infinite number of channels. For single-channel calls, the call and load intensities are identical. A traffic stream is characterized by the parameters (a, z, m), where "a" is the mean load intensity, "z" is the peakedness of the call intensity, and "m" is the number of channels required per call. Thus, the mean load intensity is m-times the mean call intensity, the variance of the load intensity is $m^2$-times the variance of the call intensity, and the peakedness of the load intensity is mz. The notation (a, z, m|n) is used to indicate that the stream (a, z, m) is offered to a loss system of n channels. Two streams ($a_i$, $z_i$, $m_i$) and ($a_j$, $z_j$, $m_j$) are said to be 2-moment-equivalent if each of the first two moments of one stream is equal to the corresponding moment of the other, i.e., if $a_i = a_j$ and $a_i z_i m_i = a_j z_j m_j$. Consider k>1 traffic streams: $\{a_i, z_i, m_i, i=1 \ldots k\}$. If each $m_i$, i=1 ... k, is even, then clearly the systems $$\{(a_i, z_i, m_i), i = 1 \ldots k\} \Big| N \text{ and } \left\{ \left( \frac{a_i}{2}, z_i, \frac{m_i}{2} \right), i = 1 \ldots k \right\} \Big| \frac{N}{2},$$

have identical occupancy-blocking characteristics, i.e., transposition yields exactly the same traffic performance as the unrestricted assignment. Now consider the case where the offered traffic includes a single-channel stream, and set $m_1 = 1$ for notational convenience. Then, if $$\sum_{i=2}^{k} \frac{a_i}{m_i} \mod(m_i, 2) < a_1$$

(a condition which would almost always be satisfied), and if each accepted single-channel arrival is assigned to the frame segment with the larger number of free channels (or randomly in case of equality), the states of the two segments would be almost in full correlation, rendering the capacity reduction due to partitioning unnoticeable. The analysis of the case of an isolated concentrating node, with Poissonian or peaked input, is straightforward [2]-[5]. In the unrestricted-assignment case we analyze the system: $\{a_i, z_i, v_i, i=1 \ldots k\}|N$, and in the transposed-assignment case we analyze the system: $\{a_i, z_i, v_i, i=1 \ldots k\}|n$, where $a_i=a_i/2$, $v_i=\lceil m_i/2 \rceil$, and $n=N/2$.

The extension of the above analysis to a network interconnecting a large number of concentrating nodes through single-stage distributing nodes (FIG. 3a) is straightforward. The main difference is that the load intensity of each stream is reduced by its downstream blocking. The solution is then determined by a simple iterative process.

The analysis of matching nodes is more involved. We shall limit the discussion here to the T-S-T node. Let M be the number of channels per frame in the inner buses (II and III in FIG. 4a). M may be selected to be larger than N, the number of channels in the outer buses (I and IV in FIG. 4a), to facilitate the matching process. At high occupancy, the matching loss in T-S-T nodes increases sharply as the number of slots per call increases and a substantial expansion (M>N) is needed to improve the efficiency of trunk groups joining such nodes [6].

Let the random variables X and Y represent the numbers of free channels at the inner buses of the originating and terminating time switches (or vice versa). Then, under full sharing and with unrestricted slot assignment, the mismatch probability (temporal matching loss) for an m-channel call is:

$$\eta = \sum_{i=0}^{m-1} \frac{\binom{X}{i}}{\binom{M}{Y}} \binom{M-X}{Y-i},$$

$X \geq m, Y \geq m, X + Y < M + m,$ ($\eta = 0$ if $X + Y \geq M + m$, and $\eta = 1$ if $X < m$ or $Y < m$).

In the segmented transposed system, with proper allocation of single-slot calls, the numbers of free slots in the upper and lower segments of the frame are equalized, and the mismatch probability in each segment can be approximated by:

$$\bar{\eta} = \sum_{i=0}^{\bar{m}} \frac{\binom{x}{i}}{\binom{M/2}{y}} \binom{M/2-x}{y-i},$$

where $x=\lfloor X/2 \rfloor$, $y=\lfloor Y/2 \rfloor$, and $\bar{m}=m/2-1$; $\lfloor . \rfloor$ denotes truncation and $\lceil . \rceil$ rounding-up. $\bar{\eta}$ is slightly higher than $\eta$ in the range of interest, and the occupancy conditions in the two segments are strongly correlated. Thus, the net matching loss is slightly higher than $\eta$. Blocking occurs due to insufficient free slots at the inlet and/or outlet buses (I and IV in FIG. 4), or due to insufficient matching slots in the inner buses (II and III). The performance is determined using a state-dependent arrival process [6] and the capacity reduction due to transposed switching is shown to be insignificant.

In the spatial-matching network of FIG. 5, comprising two concentrating stages and two distributing stages, the spatial matching loss is typically much lower than the blocking in the outer stages and the performance is comparable to that of the "ideal" network of FIG. 3.

We evaluate the transposition technique by comparison with the case of unrestricted assignment, which yields maximum traffic capacity. The packing solution is studied by means of simulation for networks employing single-time-stage nodes. The number of slots per frame is chosen to be 1024, and the offered traffic comprises three streams of equal offered-load intensities and per-call channel requirements of 1, 8, and 32. We use the blocking seen by the 32-slot stream as the grade-of-service.

Figure 7:
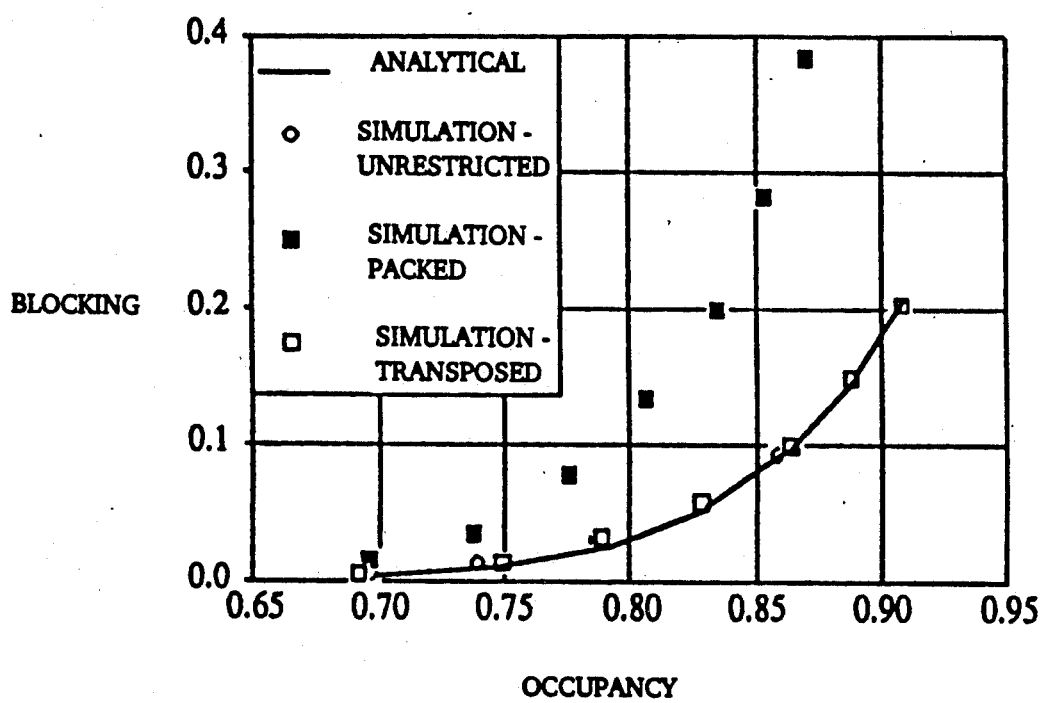
FIG. 7 is a graph of blocking against total occupancy for a single concentrator.

FIG. 7 shows the load-service characteristics of an isolated concentrating node for the cases of unrestricted slot assignment, transposed assignment, and packed assignment. It is seen that the blocking with transposed assignment is indistinguishable from that with unrestricted assignment while the packing technique yields much higher blocking. The offered streams are assumed to be Poissonian and the analytical solution is determined by a well-known recursion reported in [2][3].

Figure 3D:
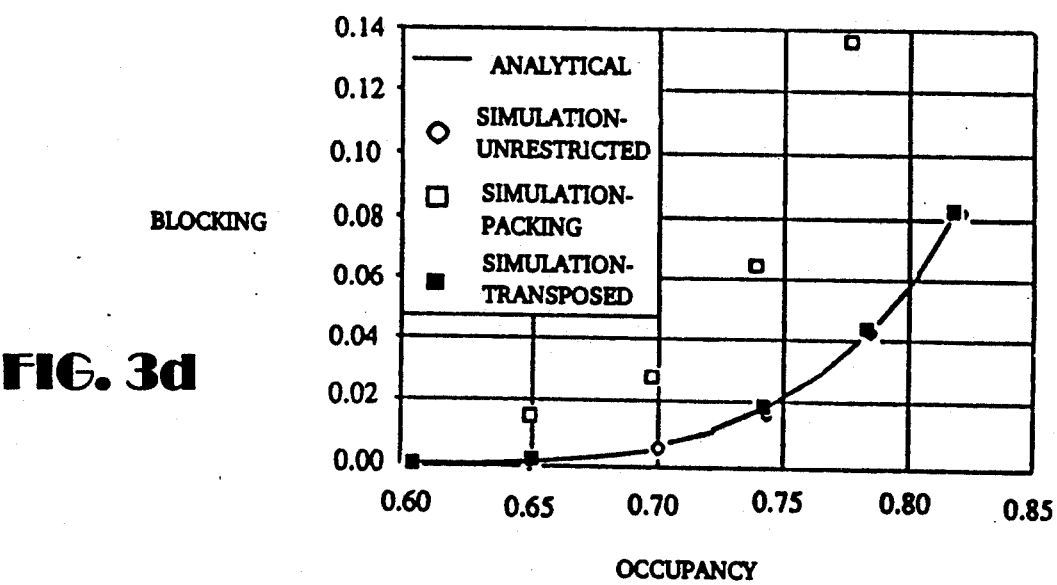
FIG. 3d is a graph of blocking versus total occupancy for the network of FIG. 3a comparing the invention with other techniques.

FIG. 3d shows the end-to-end performance of a network comprising a large number of identical concentrating nodes, interconnected through a large nonblocking single-stage distributing node. The distributing node is assumed to employ frame-retention with the concentrating nodes using transposition only. The concentrating nodes are offered equal uncorrelated traffic loads with a uniform community of interest. The analytical solution is obtained by an iterative application of the recursion in [2][3], with the load intensity of each stream reduced by its computed blocking (hence the iterations).

FIG. 4d shows the performance of a T-S-T distributing node with no expansion in the time stages (M=N in FIG. 4). The solid curve represents the analytical solution, with unrestricted assignment and with the search for matching slots starting from a randomly-selected slot. The simulation results shown are based on starting the search from a fixed slot (or a fixed slot in each segment in the case of transposition); starting from a fixed slot reduces the mismatch probability to some extent, but the corresponding analytical solution is somewhat involved. The analytical solution, with the random starting slot, should serve as an upper-bound for the unrestricted assignment case.

It is seen from these examples that the simple transposition technique does not result in any noticeable loss of traffic capacity.

REFERENCES

[1] Roberts, J. W. and Hoang Van A., "Characteristics of Services Requiring Multi-Slot Connections and their Impact on ISDN Design", Proceedings of the fifth ITC Seminar, Lake Como, Italy, May 1987, pp. 97-115.

[2] Roberts, J. W., "A Service System with Heterogeneous User Requirements", Performance of Data Communications Systems and their Applications, G. Pujolle (Ed.), North Holland (1981).

[3] Kaufman, J. S., "Blocking in a Shared Resource Environment", IEEE Trans. on Com. Vol. 29, No. 10, pp 1474-1481 (1981).
[4] Delbrouck, L. E. N. "On the Steady-State Distribution in a Service Facility Carrying Mixtures of Traffic with Different Peakedness Factors and Capacity Requirements", IEEE Trans. on Com. Vol. 31, No. 11, pp 1209-1211 (1983).
[5] Beshai, M. E., "The Poissonian Spectrum Method for Treating a Loss system Serving Non-Poissonian Multi-bit-Rate Traffic", IEEE InfoCom'89, Ottawa, Canada, pp. 101-1018.
[6] Beshai, M. E., and Manfield, D. R., "Multichannel Services: Performance of Switching Networks", Proc. ITC 12, Torino, Italy (1988), pp. 857-864.

We claim:

1. In a time-division multiplexed (TDM) network having at least one time switching stage for time switching a TDM transmission, said network organizing transmitted data into frames, each frame comprising an equal number of time slots and containing at least one multi-channel call, a process for efficiently providing high bandwidth transmissions over said network, the process including the steps of:
dividing each frame into a first segment and a second segment each containing substantially the same number of time slots,
dividing the number of channels of the multi-channel call into a first subset and a second subset each containing approximately the same number of channels,
assigning the first subset to the first segment of the first frame and assigning the second subset to the second segment of the first frame, and
in said time switching stage, (a) transposing the first subset to the second segment of the first frame such that the channels within the first subset occupy eligible free slots and retain their relative order, and (b) transposing the second subset to the first segment of the next frame such that the channels within the second subset occupy eligible free slots and retain their relative order.

2. The process of claim 1 further comprising in a subsequent time switching stage transposing the transposed subsets in a manner identical to the transpositions obtained in the first time switching stage such that the channels of the multi-channel call are all contained in the same frame and in the same slot order as the unswitched call.

3. The process of claim 2 in which there is an even number of such switching stages, whereby after the final switching stage the channels of the multi-channel call are all contained in the same frame and in the same slot order as the unswitched call.

4. The process of claim 2 in which there is an odd number of switching stages in total, all of the switching stages except one being switching stages involving transposing, the one exception being a time switching stage in which both subsets are retained in their respective frame segments by a frame retention technique without being transposed, whereby after the final switching stage the channels of the multi-channel call are all contained in the same frame and in the same slot order as the unswitched call.

5. The process of claim 1 in which the number of slots in the first segment is the same as in the second segment.

6. The process of claim 1 in which the number of slots in the first segment is the same as in the second segment and the number of channels in the first subset is the same as in the second subset.

7. The process of claim 1 in which the number of slots in the first segment is the same as in the second segment and the number of channels in one of the subsets is greater by one than the number of channels in the other subset.

8. The process of claim 7 in which the first subset has the greater number of channels.

9. The process of claim 2 in which the number of slots in the first segment is the same as in the second segment.

10. The process of claim 2 in which the number of slots in the first segment is the same as in the second segment and the number of channels in the first subset is the same as in the second subset.

11. The process of claim 2 in which the number of slots in the first segment is the same as in the second segment and the number of channels in one of the subsets is greater by one than the number of channels in the other subset.

12. The process of claim 11 in which the first subset has the greater number of channels.

13. The process of claim 3 in which the number of slots in the first segment is the same as in the second segment.

14. The process of claim 3 in which the number of slots in the first segment is the same as in the second segment and the number of channels in the first subset is the same as in the second subset.

15. The process of claim 3 in which the number of slots in the first segment is the same as in the second segment and the number of channels in one of the subsets is greater by one than the number of channels in the other subset.

16. The process of claim 15 in which the first subset has the greater number of channels.

17. The process of claim 4 in which the number of slots in the first segment is the same as in the second segment.

18. The process of claim 4 in which the number of slots in the first segment is the same as in the second segment and the number of channels in the first subset is the same as in the second subset.

19. The process of claim 4 in which the number of slots in the first segment is the same as in the second segment and the number of channels in one of the subsets is greater by one than the number of channels in the other subset.

20. The process of claim 19 in which the first subset has the greater number of channels.

* * * * *